United States Patent [19]
Frailly

[11] 3,741,266
[45] June 26, 1973

[54] PREVAILING TORQUE LOCKNUT
[75] Inventor: Robert Adam Frailly, Massillon, Ohio
[73] Assignee: Eaton Corporation, Cleveland, Ohio
[22] Filed: Nov. 22, 1971
[21] Appl. No.: 200,959

[52] U.S. Cl. ............................................. 151/21 B
[51] Int. Cl. ........................................... F16b 39/30
[58] Field of Search ........................ 151/21 B, 21 C

[56] References Cited
UNITED STATES PATENTS
206,566    7/1878   Hemelright ...................... 151/21 C
1,967,276  7/1934   Wilson ............................. 151/21 B Primary Examiner—Edward C. Allen
Attorney—Howard D. Gordon

[57] ABSTRACT

An all-metal prevailing-torque locknut having two substantially equally spaced, arcuate indentations in its top endface. The endface indentations displaces the two adjacent circumferentially aligned internal threads both radially inwardly and axially downwardly and also give the adjacent threaded bore an ovular configuration.

2 Claims, 3 Drawing Figures

PATENTED JUN 26 1973 3,741,266

INVENTOR.
ROBERT A. FRAILLY
BY
ATTORNEYS

PREVAILING TORQUE LOCKNUT

BACKGROUND OF THE INVENTION

1. Field of the Invention

This invention relates to all-metal prevailing-torque locknuts and more particularly to prevailing torque locknuts utilizing a novel indentation construction to deform a portion of the internal threads and the threaded bore.

2. Description of the Prior Art

Several types of all-metal prevailing-torque locknuts utilizing various types of indentation or other forms of deformation are known in the prior art. However, the prior art locknuts have not been totally satisfactory in that they have generally failed to meet the recognized (Industrial Fasteners Institute) standards for both reuseability and for locking or resistance to forces tending to cause loosening or backoff such as vibrations.

BRIEF SUMMARY OF THE INVENTION

The present invention overcomes the drawbacks of the prior art to the extent that an all-metal prevailing-torque locknut is provided which meets or exceeds the recognized standards both for reuseability and resistance to loosening and backoff. The above is accomplished by providing a locknut having two equally circumferentially spaced arcuate indentations in its top endface. Each indentation is in the form of a segment of a circle which is generally concentric with the threaded bore of the locknut and each segment extends circumferentially for approximately 110° and is spaced circumferentially by approximately 70° from the other segment. The indentation segments are so formed as to distort the two adjacent circumferentially aligned threads both axially downwardly and radially inwardly. The indentation structure utilizing two 110° segments of threads with distortion or locking threads, separated by 70° segments of relief or resilient areas has been found to provide a novel prevailing-torque locknut which meets or exceeds the generally accepted standards of reuseability and locking properties.

An object of the present invention is to provide an all-metal prevailing torque locknut having adequate holding torque after repeated applications.

Another object of the invention is to provide a locknut having radially distorted thread areas adapted to frictionally engage the male threaded members and further to provide undistorted thread areas, interposed the distorted thread areas, adapted to provide resiliency for reuseability of the locknut.

A further object of the present invention is to provide a prevailing torque locknut having a unique endface indentation pattern which allows the locknut to meet or exceed the recognized standards for locking and reuseability.

These and other objects of the present invention will be apparent to those skilled in the art for the accompanying drawings, specifications and claims.

DETAILED DESCRIPTION OF THE INVENTION

Figure 1:
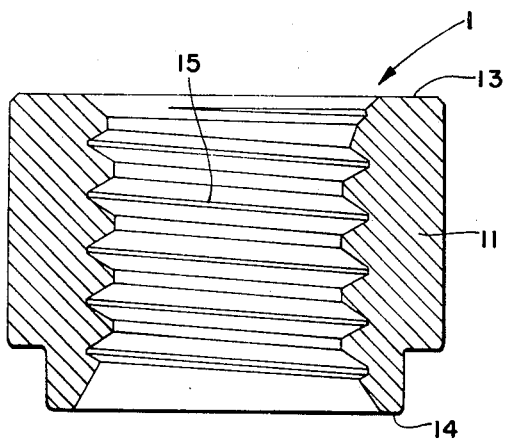
FIG. 1 is a vertical sectional view of the nut before concerting the nut into a locknut.
Figure 2:
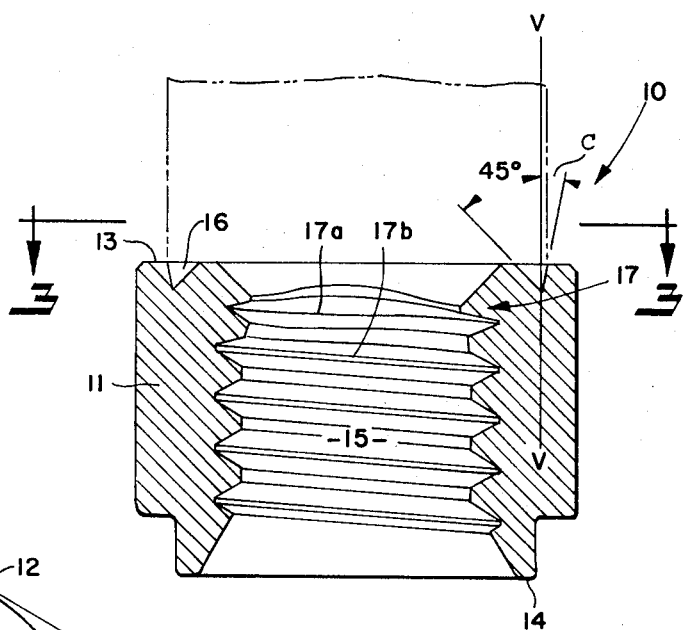
FIG. 2 is a vertical sectional view of the completed locknut illustrating the distorted threads in elevation.
Figure 3:
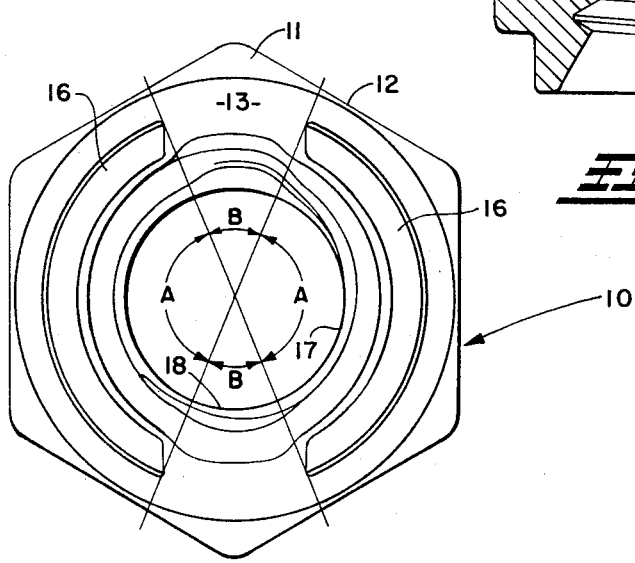
FIG. 3 is a top view of the completed locknut of the present invention as viewed from line 3—3 of FIG. 2.

The nut 1, illustrated in FIG. 1, and the locknut 10 formed therefrom, illustrated in FIGS. 2 and 3, are of a hexagonal outer configuration comprising a nut body 11 having six flats or sidewalls 12 and a top and a bottom endface, 13 and 14 respectively. The nut body 11 is provided with a threaded through bore 15 which is coaxial with the hexagonal cross-section of the nut.

The locknut 10 is formed by subjecting nut 1 to a staking operation wherein indentations or grooves 16 are formed by a staking tool shown in phantom lines in FIG. 2. The grooves 16 so formed are generally V-shaped having an angle of approximately 45° with respect to the vertical closest the bore and an angle C of approximately 4° – 8° with respect to the vertical furthest the bore. It has been found that the above V shaped pattern allows for a thread deformation, as at 17, of the two adjacent threads, 17a and 17b respectively, circumferentially aligned with the grooves which is both axially downwardly and radially inward. It has been found that deforming the second 17b as well as the first 17a adjacent thread provides a locknut of excellent operational characteristics. The bore adjacent the indented endfaces also gives a generally ovular configuration.

The grooves 16, when viewed from endface 13, are of a semicircular or arcuate configuration and are equally circumferentially spaced by undepressed areas. The angle B in FIG. 3 indicates the circumferential angle of unindented space separating the grooves. It is to be carefully noted that the threads 17 adjacent and circumferentially aligned with the indentation grooves 16 are deformed while the threads 18 circumferentially aligned with the unindented area are not deformed. It is this section 18 of undeformed threads which acts as a relief or resiliency area to provide reuseability while the deformed threads 17 are the threads providing locking action. The undeformed threads 18 allow the deformed threads 17 to behave as springs for both locking and reuseability qualities.

Experimentation has indicated that an indentation angle A of 90°–120° with an unindented angle B of 90°–60° is a workable range for relative circumferential length of the indented and unindented areas with a preferred angle A of about 110° and a preferred angle B of about 70° for optimization of desired locking and reuseability qualities.

Although this invention has been described in its preferred form with a certain degree of particularity, it is understood that the present disclosure of the preferred form has been made only by way of example and that numerous changes in the details of construction may be resorted to without departing from the spirit and the scope of the invention as hereinafter claimed.

I claim:

1. A prevailing torque locknut maintaining substantially constant torque during repeated on/off applications comprising:

a nut body having a plurality of substantially flat sidewalls;

an upper and lower end face and a threaded bore therethrough;

said upper end face having two substantially arcuate, equally circumferentially-spaced grooves indented therein and concentric with said threaded bore;

said grooves circumferentially spaced from one another to define an included angle from the axis of said bore and between the ends of said grooves in the range of 90°– 120° and said grooves further defined by downwardly-extending converging walls with the wall of said grooves closest said threaded bore, forming an angle of approximately 45° with the vertical and the wall distant said bore forming an angle of 6° – 8° with the vertical; and said threaded bore having its uppermost two threads at said upper end face portion of said nut axially-downwardly and radially-inwardly resiliently deformed along their thread portions adjacent to and circumferentially-aligned with said grooves and the portions of said two threads circumferentially-aligned with the unindented end face being substantially free from deformation, the uppermost thread deformed more than the other.

2. The prevailing torque locknut of claim 1 wherein said included angle is approximately 110°.

* * * * *